US009600357B2

(12) United States Patent
Lim

(10) Patent No.: US 9,600,357 B2
(45) Date of Patent: Mar. 21, 2017

(54) ERROR DETECTION METHOD OF FAILSAFE SOFTWARE

(71) Applicant: HYUNDAI MOBIS CO., LTD., Seoul (KR)

(72) Inventor: Tae Wan Lim, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 3 days.

(21) Appl. No.: 14/619,034

(22) Filed: Feb. 10, 2015

(65) Prior Publication Data

US 2016/0147584 A1 May 26, 2016

(30) Foreign Application Priority Data

Nov. 20, 2014 (KR) ........................ 10-2014-0162911

(51) Int. Cl.
*G06F 11/07* (2006.01)
(52) U.S. Cl.
CPC ........ *G06F 11/079* (2013.01); *G06F 11/0739* (2013.01); *G06F 11/0751* (2013.01); *Y02T 10/7258* (2013.01)
(58) Field of Classification Search
CPC .. B62D 5/0493; B62D 5/0484; B62D 5/0487; H02H 7/0844; H02H 7/085; H02M 1/08; H02M 1/32
USPC ....... 701/29, 43, 62, 76, 92, 93; 318/400.22, 318/400.3, 563, 434, 400.01, 400.07; 714/48
See application file for complete search history.

(56) References Cited

U.S. PATENT DOCUMENTS

| | | | | |
|---|---|---|---|---|
| 4,502,446 A * | 3/1985 | Kanegae | ............... | F02P 5/1502 123/479 |
| 5,805,797 A * | 9/1998 | Sato | ........................ | B61L 3/008 714/48 |
| 5,928,366 A * | 7/1999 | Kawasaki | ........... | H02P 23/0077 713/601 |
| 2005/0189890 A1* | 9/2005 | Kuramochi | ............... | H02P 3/04 318/139 |
| 2009/0079373 A1* | 3/2009 | Nagase | ................ | B62D 5/0487 318/400.22 |
| 2011/0285335 A1* | 11/2011 | Tada | ..................... | H02H 7/0844 318/400.22 |
| 2013/0141031 A1* | 6/2013 | Yamada | ............. | G05B 19/4062 318/603 |
| 2014/0156090 A1* | 6/2014 | Krishnan | ............. | G05D 7/0617 700/282 |

(Continued)

FOREIGN PATENT DOCUMENTS

JP 09-101802 A 4/1997
JP 2011-244611 A 12/2011

*Primary Examiner* — Marthe Marc-Coleman

(57) ABSTRACT

Disclosed is an error detection method of fail safe software, the method including outputting a pulse signal according to an operation state of fail safe software monitoring a fail safe function of a motor control device; determining presence or absence of an error of the fail safe software using a frequency of the pulse signal; and controlling an output of the motor control device based on the presence or absence of the error of the fail safe software. Accordingly, even though whether the motor control device is in an abnormal state is not determined due to an error of the fail safe software, it is possible to prevent excessive motor torque from occurring.

14 Claims, 2 Drawing Sheets

(56) References Cited

U.S. PATENT DOCUMENTS

2015/0055258 A1\* 2/2015 Koeppl ............... H02H 7/0844
361/30

\* cited by examiner

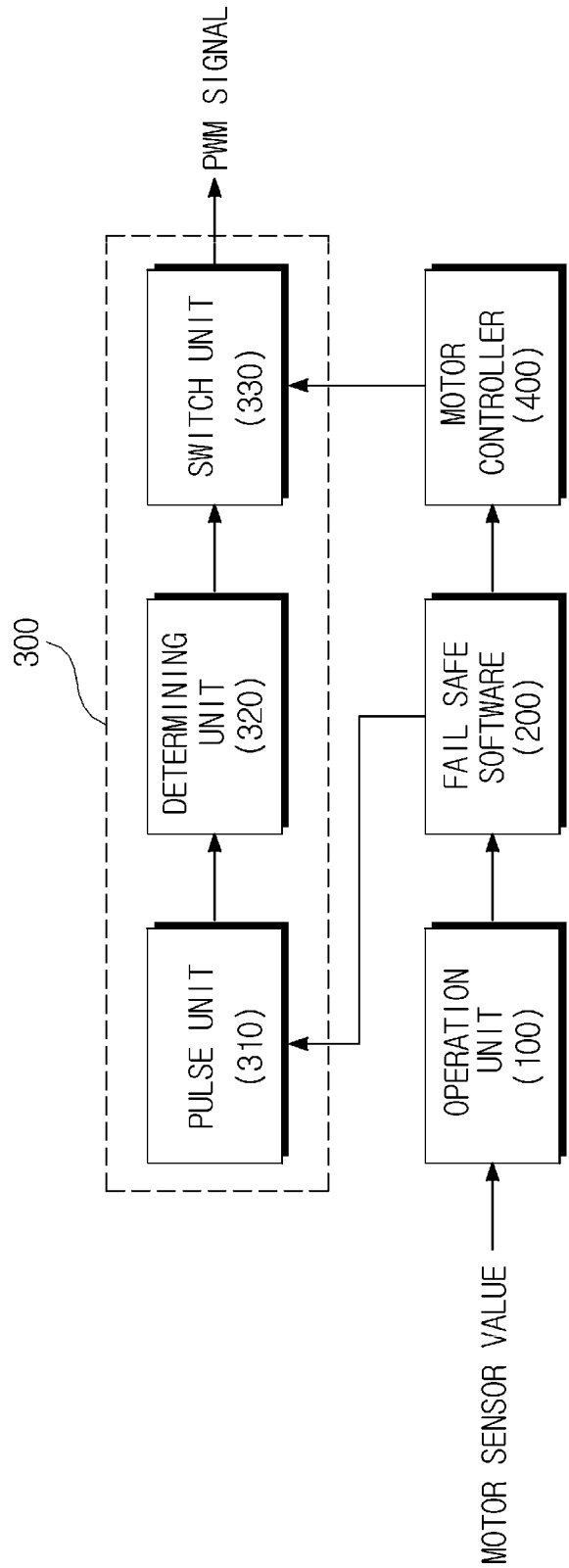

ERROR DETECTION METHOD OF FAILSAFE SOFTWARE

CROSS-REFERENCE TO RELATED APPLICATIONS

This application claims priority to and the benefit of Korean Patent Application No. 10-2014-0162911 filed in the Korean Intellectual Property Office on Nov. 20, 2014, the entire contents of which are incorporated herein by reference.

TECHNICAL FIELD

The present invention relates to an error detection method of fail safe software, and more particularly, to an error detection method of fail safe software that monitors a fail safe function of a motor control device used to control a motor of a vehicle.

BACKGROUND ART

A motor control device of a hybrid electric vehicle and/or an electric vehicle according to the related art drives a vehicle or various types of electronic devices within the vehicle by controlling a driving motor installed in the vehicle. The motor control device obtains a variety of information, such as a current flowing in a motor or a rotor location, from various types of sensors such as a current sensor and a location sensor, and uses the obtained variety of information to control the motor.

The motor control device uses an inverter to control torque of the driving motor. This inverter operates in response to an instruction received from an upper controller and controls the driving motor by converting a direct current (DC) voltage of a battery to a variable alternating current (AC) voltage through pulse width modulation (PWM) control.

When excessive torque occurs in the motor of which the torque is controlled by the inverter, the stability of a vehicle system may be significantly degraded.

Currently, to improve the stability of the system to meet the expectations of a full system of a vehicle, software for a fail safe function is embedded within an electronic control unit (ECU). Fail safe software is applied even to the inverter to improve the stability of the driving motor.

However, when the fail safe software of the inverter is not executed due to a software defect or an operational defect within the ECU, for example, a memory error, a malfunction of the inverter is not detected even while the inverter is in an abnormal state, which has caused the driving motor controlled by the inverter in the abnormal state not to be properly operated.

Accordingly, there is a need to improve the stability of a motor control device by appropriately monitoring whether fail safe software of an inverter applied to a motor control device of a hybrid electric vehicle and/or an electric vehicle normally operates.

SUMMARY OF THE INVENTION

The present invention has been made in an effort to provide an error detection method of fail safe software that may prevent excessive motor torque from occurring due to an error of the fail safe software by checking an operation state of the fail safe software monitoring a fail safe function of an inverter, by generating a pulse signal according to the operation state of the fail safe software, and by controlling an output of a pulse width modulation (PWM) signal of the inverter based on whether a frequency of the generated pulse signal is within a reference frequency range.

An exemplary embodiment of the present invention provides an error detection method of fail safe software, the method including outputting a pulse signal according to an operation state of fail safe software monitoring a fail safe function of a motor control device; and determining presence or absence of an error of the fail safe software using a frequency of the pulse signal.

The error detection method may further include controlling an output of the motor control device based on the presence or absence of the error of the fail safe software.

The outputting may output the pulse signal according to a predetermined algorithm prior to initiating an operation of the fail safe software.

The outputting may suspend an output of the pulse signal according to the algorithm after terminating the operation of the fail safe software.

The pulse signal may be output through an output terminal switched to be in an ON or OFF state according to the algorithm.

When the operation of the fail safe software is initiated, the output terminal may be switched to be in an ON state according to the algorithm.

When the operation of the fail safe software is terminated, the output terminal may be switched to be in an OFF state according to the algorithm.

The determining may determine the presence or absence of the error of the fail safe software by comparing the frequency of the pulse signal and a predetermined reference frequency range.

The determining may determine the fail safe software as a normal state when the frequency of the pulse signal is within the reference frequency range.

The determining may determine the fail safe software as an error state when the frequency of the pulse signal is outside the reference frequency range.

The determining may generate a pulse width modulation (PWM) enable signal when the fail safe software is in the normal state.

The determining may generate a PWM disable signal when the fail safe software is in the error state.

The controlling may allow the output of the motor control device in response to the PWM enable signal.

The controlling may cut off the output of the motor control device in response to the PWM disable signal.

Another exemplary embodiment of the present invention also provides an error detection apparatus of fail safe software, including an pulse unit configured to output a pulse signal according to an operation state of fail safe software monitoring a fail safe function of a motor control device; a determining unit configured to determine presence or absence of an error of the fail safe software using a frequency of the pulse signal; and a switch unit configured to control an output of the motor control device based on the presence or absence of the error of the fail safe software.

An error detection method of fail safe software according to exemplary embodiments of the present invention may check an operation state of the fail safe software monitoring a fail safe function of an inverter, may generate a pulse signal according to the operation state of the fail safe software of the inverter, and may control a pulse width modulation (PWM) signal of the inverter based on whether a frequency of the generated pulse signal is within a reference frequency range and thus, may prevent excessive motor torque from occurring due to an error of the fail safe software.

Since it is possible to prevent the excessive motor torque from occurring due to deadlock of the file safe software, a defect such as a stack overflow, or an operational defect of an electronic control unit (ECU), it is possible to improve the stability of a motor control system applied to a vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 2 is a block diagram briefly illustrating an error detection apparatus of fail safe software according to an exemplary embodiment of the present invention.

Figure 1:
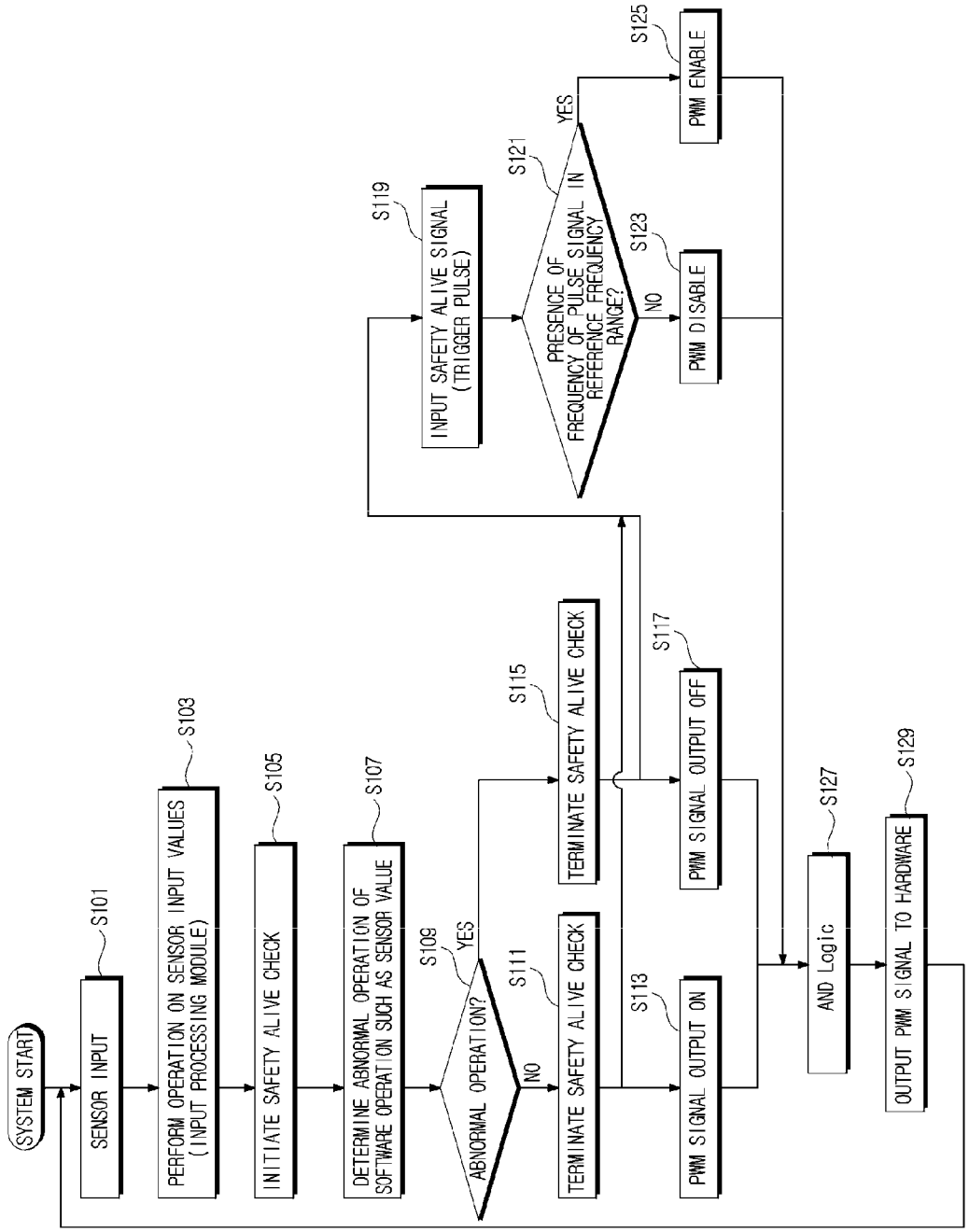
FIG. 1 is a flowchart briefly illustrating an error detection method of fail safe software according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

To fully understand the present invention, operational advantages of the present invention, and the purposes achieved by implementation of the present invention, the accompanying drawings exemplifying exemplary embodiments of the present invention and descriptions disclosed therein should be referred to.

Hereinafter, exemplary embodiments of the present invention will be described in detail with reference to the accompanying drawings. However, the present invention may be embodied in various different embodiments and are not limited to the embodiments described herein. To clearly describe the present invention, a portion irrelevant to the description is omitted and like reference numerals in the drawings refer to like constituent elements.

Throughout the specification, when it is described that a predetermined portion "includes (comprises)" a predetermined constituent element, it indicates that the predetermined portion may further include the other constituent element, instead of excluding the other constituent element, unless described otherwise in the context. Also, the terms, such as "unit", "~er/or", "module", "block", and the like used in the specification indicates a unit for processing at least one processing or operation, which may be embodied through hardware, software, or a combination of hardware and software.

Referring to FIGS. 1 and 2, in an error detection method of fail safe software according to an exemplary embodiment of the present invention, various types of sensors of a motor control device input sensor values measured from a motor to an operation unit 100 (S101). Here, the motor control device is to drive a vehicle, and includes the operation unit 100, fail safe software 200, and a motor controller 400.

The various types of sensors include a current sensor to measure current flowing in the motor and a location sensor to detect a rotor location of the motor. The sensor values are information obtained by the various types of sensors from the motor.

The operation unit 100 generates a pulse width modulation (PWM) signal for controlling the motor by operating the received sensor values (S103).

An error detection apparatus 300 according to an exemplary embodiment of the present invention checks an operation state (safety alive) of the fail safe software 200 (S105). Here, the operation state check of the fail safe software 200 indicates outputting a pulse signal according to a predetermined algorithm prior to initiating an operation of the fail safe software 200.

The algorithm is designed based on a user necessity and may be designed to generate and output a pulse signal between a PWM signal generation operation and an operation initiation operation of the fail safe software 200. Also, the algorithm may be designed to suspend an output of the pulse signal between an operation termination operation of the fail safe software 200 and a PWM signal output operation.

For example, when the fail safe software 200 normally operates, the pulse signal may be output during a predetermined period of time and have a normal frequency. When the fail safe software 200 abnormally operates, the pulse signal is output during a relatively short period of time compared to being in a normal state and to have an abnormal frequency.

The pulse signal having the normal frequency or the abnormal frequency may be used to determine whether the fail safe software 200 is in a normal state through a subsequent comparison with a reference frequency range.

The fail safe software 200 determines whether a software function such as a sensor value and a PWM signal or a hardware function of the motor control device abnormally operates (S107). Here, the abnormal operation determination may be performed through an original function of the fail safe software 200. A detailed description related thereto is omitted.

The fail safe software 200 selectively performs a subsequent operation based on the abnormal operation determination regarding the software function or the hardware function of the motor control device (S109).

When the operation of the fail safe software 200 is terminated irrespective of the abnormal operation determination, the error detection apparatus 300 terminates the operation state check of the fail safe software 200 (S111 and S115).

Here, terminating the operation state check of the fail safe software 200 indicates suspending the output of the pulse signal according to a predetermined algorithm after terminating the operation of the fail safe software 200.

Such pulse signal may have various frequencies over an operation time of the fail safe software 200. A frequency of the pulse signal may be used to determine whether the fail safe software 200 normally operates.

When the fail safe software 200 determines that an abnormal operation has not occurred in the software function or the hardware function of the motor control device, the motor controller 400 outputs the PWM signal generated in operation S103 (S113).

Here, the motor controller 400 may output the PWM signal according to a control of the fail safe software 200 having verified that an abnormal operation is absent in the software function or the hardware function of the motor control device.

Describing another operation after operation S109, when the fail safe software 200 determines that an abnormal operation has occurred in the software function or the hardware function of the motor control device, the motor controller 400 suspends the output of the PWM signal generated in operation S103 (S117). Here, the output of the PWM signal may be suspended in such a manner that the fail safe software 200 controls the motor controller 400.

Describing an operation after operation S113 or S117, a pulse unit 310 of the error detection apparatus 300 inputs, to a determining unit 320, the pulse signal (trigger signal) generated through the aforementioned initiation and termination of the operation state check of the fail safe software 200 (S119).

The determining unit 320 determines whether a frequency of the pulse signal input for an error detection of the fail safe software 200 is within a predetermined reference frequency range (S121). Here, the reference frequency range may be set by including a predetermined error range based on the frequency of the pulse signal output when the fail safe software 200 is in a normal state.

When the frequency of the pulse signal is outside the predetermined reference frequency range, the determining unit 320 generates a PWM disable signal (S123). Here, the PWM disable signal is a reference signal used to determine one more time whether to output the PWM signal that is output in operation S113.

When the frequency of the pulse signal is within the predetermined reference frequency range, the determining unit 320 generates a PWM enable signal (S125). Here, similar to the aforementioned PWM disable signal, the PWM enable signal is a reference signal used to determine one more time whether to output the PWM signal that is output in operation S113.

A switch unit 330 controls an output of the PWM signal by comparing the PWM signal output in operation S113 and the PWM disable signal output in operation S123 or the PWM enable signal output in operation S125 (S127). Here, the comparison refers to an AND logic between different signals. The PWM signal may be finally output as a result of performing an AND logic on a magnitude level of the PWM signal and a magnitude level of the PWM disable signal or the PWM enable signal.

For example, the PWM signal may have a magnitude level corresponding to a high level, the PWM enable signal may have a magnitude level corresponding to a high level, and the PWM disable signal may have a magnitude level corresponding to a low level.

Accordingly, when the PWM signal and the PWM enable signal are input, the mutual magnitude levels are high levels and thus, the final output of the PWM signal through the AND logic may be allowed. When the PWM signal and the PWM disable signal are input, the mutual magnitude levels differ from each other and thus, the final output of the PWM signal through the AND logic may be suspended.

The switch unit 330 finally outputs, to an external device (hardware), the PWM signal determined to be output through the AND logic with the PWM enable signal (S129). Here, the external device may convert a DC voltage of a battery to an AC voltage based on the PWM signal, and may apply the converted AC voltage to the motor, and may be a switch (an insulated gate bipolar mode transistor (IGBT) connected between the battery and the motor to convert the DC voltage of the battery to the AC voltage and transfer the converted AC voltage.

Finally, the motor operates based on the finally output PWM signal of the motor control device, the current sensor or the location sensor obtains a sensor value by detecting an operation of the motor and inputs the obtained sensor value to the motor control device, and the motor control device may control the motor by processing the sensor value.

Referring to FIG. 2, the error detection apparatus 300 of fail safe software according to an exemplary embodiment of the present invention may include the pulse unit 310, the determining unit 320, and the switch unit 330.

The pulse unit 310, as a device to output a pulse signal before and after an operation of the fail safe software 200, may generate and output a pulse signal prior to initiating the operation of the fail safe software 200 and may suspend the output of the pulse signal after terminating the operation of the fail safe software 200. Here, the output of the pulse signal may be performed through a state switching of an output terminal connected to an output end of the pulse unit 310 and connected to an input end of the determining unit 320.

For example, the pulse unit 310 may output a pulse signal generated by switching an output terminal to be in an ON state according to a predetermined algorithm prior to initiating the operation of the fail safe software 200, and may suspend the output of the pulse signal by switching the output terminal to be in an OFF state according to the predetermined algorithm after initiating the operation of the fail safe software 200.

The determining unit 320 is a device to determine whether the fail safe software 200 is in a normal state using a frequency of the pulse signal transferred from the pulse unit 310. Here, when the frequency of the pulse signal transferred from the pulse unit 310 is within a normal range, the determining unit 320 may determine that the fail safe software 200 is in the normal state and may generate a PWM enable signal. On the contrary, when the frequency of the pulse signal transferred from the pulse unit 310 is outside the normal range, the determining unit 320 may determine that the fail safe software 200 is in an error state and may generate a PWM disable signal.

The switch unit 330 may determine whether to finally output the PWM signal that is output through the operation unit 100 and the motor controller 400 based on the PWM enable signal or the PWM disable signal transferred from the determining unit 320.

Here, the operation unit 100 and the motor controller 400 may be included in the motor control device. When the PWM enable signal is transferred from the determining unit 320, the switch unit 330 may finally output the PWM signal. When the PWM disable signal is transferred from the determining unit 320, the switch unit 330 may suspend the output of the PWM signal since the fail safe software 200 is in an abnormal state.

As described above, the error detection apparatus 300 according to an exemplary embodiment of the present invention may cut off the output of the PWM signal even though the fail safe software 200 does not detect an abnormal operation of the operation unit 100 or the motor controller 400. Accordingly, the error detection apparatus 300 may prevent the motor from being controlled by the motor control device in the abnormal state and through this, may prevent excessive motor torque from occurring.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An error detection method for detecting whether an error is present in fail safe software, the method comprising:
   receiving a pulse signal output from an output terminal of a pulse width modulation circuit according to an operation state of the fail safe software that monitors a motor control device;
   determining whether an error is present in the fail safe software by comparing a frequency of the pulse signal to a reference frequency range; and
   controlling an output of the motor control device based on whether the error is present in the fail safe software,
   wherein the pulse signal is output according to a predetermined algorithm prior to initiating an operation of the fail safe software.

2. The method of claim 1, wherein output of the pulse signal is suspended according to the algorithm after terminating the operation of the fail safe software.

3. The method of claim 2, wherein the pulse signal is output through an output terminal switched to be in an ON or OFF state according to the algorithm.

4. The method of claim 3, wherein when the operation of the fail safe software is initiated, the output terminal is switched to be in an ON state according to the algorithm.

5. The method of claim 3, wherein when the operation of the fail safe software is terminated, the output terminal is switched to be in an OFF state according to the algorithm.

6. The method of claim 1, wherein determining the presence of the error in the fail safe software includes comparing the frequency of the pulse signal and a predetermined reference frequency range.

7. The method of claim 6, wherein the fail safe software is determined to be in a normal state when the frequency of the pulse signal is within the reference frequency range.

8. The method of claim 7, wherein a pulse width modulation (PWM) enable signal is generated when the fail safe software is in the normal state.

9. The method of claim 8, wherein the controlling allows the output of the motor control device in response to the PWM enable signal.

10. The method of claim 6, wherein the fail safe software is determined to be in an error state when the frequency of the pulse signal is outside the reference frequency range.

11. The method of claim 10, wherein a PWM disable signal is generated when the fail safe software is in the error state.

12. The method of claim 11, wherein the controlling cuts off the output of the motor control device in response to the PWM disable signal.

13. An error detection apparatus of that detects whether an error is present in fail safe software, the apparatus comprising:
   a pulse unit that outputs a pulse signal from an output terminal according to an operation state of the fail safe software monitoring a fail safe function of a motor control device, wherein the pulse signal is output according to a predetermined algorithm prior to initiating an operation of the fail safe software;
   a determining circuit that determines whether an error is present in the fail safe software using a frequency of the pulse signal; and
   a switch that controls an output of the motor control device based on the presence or absence of the error of the fail safe software.

14. The error detection apparatus of claim 13, wherein the determining circuit includes an AND circuit.

* * * * *